United States Patent Office 3,769,416
Patented Oct. 30, 1973

3,769,416
HYDROXYLATED POLYMER-THERMOPLASTIC RESIN-ORGANO PHOSPHATE COMPOSITIONS
Ronald S. Smith, Gilroy, and Jerome C. Kuderna, Jr., and Richard C. Potter, Modesto, Calif., assignors to Shell Oil Company, Houston, Tex.
No Drawing. Filed July 28, 1971, Ser. No. 166,977
Int. Cl. A01n 9/36
U.S. Cl. 424—78                                10 Claims

ABSTRACT OF THE DISCLOSURE

A gelled or cross-linked composition comprising in admixture (a) an activated vinyl phosphorus ester, (b) a hydroxylated polymer compatible with said ester and (c) a thermoplastic resin optionally containing a plasticizer, wherein a certain proportion of said ester is interacted with said hydroxylated polymer to form a cross-linked polymer network. Said composition is useful for killing invertebrate pests.

BACKGROUND OF THE INVENTION

This invention relates to novel combinations of activated phosphorus esters, thermoplastic resins and hydroxylated polymers compatible with said esters. More particularly, this invention relates to novel gel-like compositions containing (a) an activated organic phosphorus ester, (b) a hydroxylated polymer compatible with said ester and (c) a thermoplastic resin optionally containing a plasticizer wherein a minor amount of the activated phosphorus ester has been interacted with the hydroxylated polymer to form a cross-linked polymer network. Many of these compositions are gel-like in consistency. The amount of phosphorus involved in the cross-linking is relatively small but greatly adds to the gel strength while leaving the bulk of the phosphorus ester dispersed throughout the matrix composed of thermoplastic resin and a cross-linked ester-hydroxylated polymer network.

Activated phosphorus esters and, in particular, vinyl phosphate esters are known to be biologically active. These compounds are known to be effective in the control of invertebrate pests and function by contact, by ingestion, or by inhalation of the active ester. Moreover, when some of these compounds are formulated in a plasticized resin such as plasticized polyvinyl chloride, they are useful in controlling endoparasites in animals and birds as disclosed in U.S. Pat. 3,166,472. These activated phosphorus ester-resin formulations slowly release the active ester into the atmosphere and are also effective in the control of invertebrate pests as taught in U.S. Pat. 3,318,769. Resin formulations which slowly release a biocide, such as an activated phosphate, into the atmosphere are hereinafter referred to by such terms as slow release formulation, slow release generators or simply, generators.

While prior art slow release formulations have proven to be effective because of ease in handling, use and overall consumer acceptance, there are still certain disadvantages associated with the use of an activated phosphorus ether in a plasticized resin such as polyvinyl chloride. For example, the amount of active ingredient such as dimethyl 2,2-dichlorovinyl phosphate (DDVP) that can be combined as a practical matter with such plasticized polyvinyl chloride resin is rather low. This means that the slow release generator based on this formulation has to be rather large in size in order to contain the required amount of activated phosphorus ester. Associated with the size of the generator and the content of the active ingredient in the plasticized resin is the surface area required for the diffusion of the activated phosphorus ester into the surrounding atmosphere. In order to maintain sufficient biocide release over a sustained period of time a rather high surface are is required in proportion to the size of the generator. This, however, results in a higher initial release of biocide than is necessary. Another disadvantage of the prior art generators is the inability of the plasticized resin to maintain the active ingredient at sufficiently high concentrations. At concentrations required for efficiency a certain amount of the active phosphorus ester combines with atmospheric moisture to produce an unsightly wetness or bleeding at the surface of the generator. There are also processing disadvantages in the plasticized polyvinyl chloride resin-activated phosphorus ester combinations. For example, in extruding the prior art generators, a rather high temperature is required which results in the loss of some of the activated phosphorus ester. Moreover, there is a limitation as to the size and shape of the generators of prior art compositions that can be prepared.

Binary gel compositions consisting of an activated vinyl phosphorus ester and an hydroxylated polymer compatible with said ester are claimed in co-pending application Ser. No. 166,978, filed July 28, 1971. These compositions, while superior in many respects over the prior art, are not as strong in structural strength as may be desired for commercial use and in some instances posses a very rapid gelation rate, making the working time between the mixing of the composition and its gelation shorter than may be desired.

DESCRIPTION OF THE PRIOR ART

The closest prior art appears to be U.S. Pat. 3,318,769 which discloses compositions containing a solid organic macromolecular thermoplastic resin and a dialkyl beta halogen-substituted vinyl phosphate.

DESCRIPTION OF THE INVENTION

Compositions having gel-like consistency have now been discovered which comprise, in admixture, an activated phosphorus containing ester, a hydroxylated polymer compatible with said ester and a thermoplastic resin which has optionally been plasticized, said composition having a minor amount of the phosphorus ester interacted with said hydroxylated polymer to form a cross-linked polymer network. Whether the phosphorus in this cross-linked network is bound covalently to the hydroxylated polymer or in a strong complex is not known. The amount of phosphate involved in this cross-linking is of the order of about 0.5 to 5% by weight under normal conditions, but can be increased as curing time and curing temperature are increased. Although the cross-linking adds to the gel strength while leaving the bulk of the phosphorus ester unaffected, the gel is greatly strengthened by the presence of the thermoplastic resin. These gel compositions contain higher amounts of activated phosphorus esters per unit area than do the prior art generators made from thermoplastic resins alone, and can be made into useful generators having a lower surface area per unit of active ingredient while at the same time possessing good storage stability and are resistant to bleeding. Furthermore, these compositions are easily processed at relatively low temperatures and can be cast, molded or extruded into any desired shape or form.

It has now been found that the formulations of this invention are free of the disadvantages of the prior art formulations. The new formulations possess an enhanced diffusion coefficient, and are capable of containing relatively large amounts of activated phosphorus ester, are functional with a lower surface area, are resistant to bleeding, can be fabricated to initially release less biocide and are more easily processed into various sizes and shapes than prior art formulations.

The hydroxylated polymers which are useful in the compositions of the present invention are those which are compatible with the activated phosphorus ester. By use of the terms "compatible" or "compatibility" is meant the ability of two or more substances to mix with each other to form a homogeneous composition of useful plastic properties, or that such substances may be intimately blended. (See Kirk-Othmer, Encyclopedia of Chemical Technology, Second Edition, volume 15, page 730). Rather than the invention being limited to a particular class or classes of hydroxylated polymers, it appears that there are three criteria that a particular polymer must meet:

(1) The polymer must be compatible with the activated phosphorus ester being used, (2) The polymer must contain hydroxyl groups, and (3) The polymer must have a molecular weight in the range of about 30,000 to 1,000,000, or perhaps even higher.

This invention is not limited to any particular class or classes of polymers as any polymers are believed to be useful as long as the above criteria are met. The following classes of hydroxylated polymers have been shown to be useful in the present invention: polyvinyl acetals such as polyvinyl formal, polyvinyl acetal, polyvinyl butyral, and polyvinyl valeral having hydroxyl groups; polyvinyl esters such as polyvinyl acetate and polyvinyl butyrate containing hydroxyl groups; mixtures of polyvinyl acetal and polyvinyl esters having hydroxyl groups; terpolymers of vinyl chloride with vinyl esters having hydroxyl groups; copolymers of partially hydrolyzed vinyl chloride and polyvinyl acetate; hydroxylated cellulose ethers such as hydroxypropyl cellulose; ethylene-vinyl acetate copolymers having hydroxyl groups; hydroxylated polybutadiene, hydroxylated block copolymers such as SBS rubbers; hydroxylated polyethylene and polypropylene and copolymers thereof; and hydroxylated copolymers of vinyl acetate and acrylate esters such as polymethyl methacrylate and polyethyl methacrylate.

Preferred among the hydroxylated polymers because of their ready availability are the hydroxylated polyvinyl acetals and polyvinyl esters such as polyvinyl butyral, and hydroxylated polyvinyl acetates and mixtures thereof. These compounds may be defined by the formula:

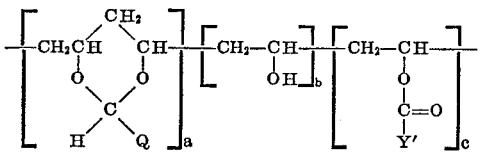

wherein Q is H, alkyl, haloalkyl or hydroxyalkyl of 1–8 carbon atoms, alkenyl of 2–8 carbon atoms, halogen or hydroxyl; Y' is alkyl of 1–9 carbon atoms, $a$, $b$, and $c$ are integers indicating the relative percent by weight of acetal, hydroxyl and ester groupings in the polymer. These groupings are randomly distributed along the molecule. In order to obtain cross-linking between the polymer and the phosphorus esters, it is necessary that the polymer contain a certain number of hydroxyl groups. As will be discussed, the number of hydroxyl groups will vary from polymer to polymer and is not subject to precise definition. Therefore, in the above formula $b$ is at least 1 and is preferably from about 3 to 35 but can be as much as 97 provided the conditions of compatibility and molecular weight are met. The $a$ and $c$ are integers from 0 to 99 and preferably from 3 to 97. The sum of $a+b+c$ equals 100.

The number or percentage of hydroxyl groups in the polymer may vary and is dependent upon the type of polymer and the compatibility of the polymer with the phosphorus ester. It may also be possible to select a polymer which does not contain hydroxyl groups but which contains groups readily convertible to hydroxyl groups. In such a case the hydroxyl groups may be formed in situ prior to or during the course of gel formation. Therefore, it is not possible to define precisely with numerical limitations just how the polymer is to be composed. Rather, the polymers to be used may readily be determined by those skilled in the art on an empirical basis. For example, polyvinyl alcohol is not compatible with a phosphate ester such as dimethyl 2,2-dichlorovinyl phosphate (DDVP). In general, the number of hydroxyl groups in the polymer, calculated as $+CH_2CHOH+$ groups, may be as low as 1.0% by weight of the total polymer with the upper hydroxyl content range being determined solely by the compatibility requirement.

The hydroxylated polymers utilized in this invention are generally commercially available and if not can be prepared by conventional means such as saponification of ester groups. For example, the polyvinyl acetals are prepared by reacting the appropriate aldehyde with polyvinyl alcohol. Polyvinyl alcohols are high molecular weight synthetic resins containing various percentages of hydroxyl and acetate groups and are produced by the hydrolysis of polyvinyl acetate. Polyvinyl alcohols are usually classified as partially hydrolyzed (5–30% polyvinyl acetate groups) and completely hydrolyzed (0–5% polyvinyl acetate groups). Both types in various molecular weights and grades are used in preparing commercial polyvinyl acetals.

Polyvinyl acetals such as polyvinyl butyral and polyvinyl formal are commercially available in various molecular weight ranges, with varying degrees of hydroxyl content.

Polyvinyl esters such as polyvinyl acetate and polyvinyl formate, polyvinyl butyrate and polyvinyl isobutyrate are also known in the art and are commercially available. These polyvinyl esters are available in a variety of molecular weights, with varying amounts of hydroxyl groups, and are made by the polymerization or copolymerization of vinyl esters in the conventional manner. Terpolymers of vinyl esters, such as vinyl acetate, with vinyl chloride and vinyl alcohol may also be used.

The phosphorus esters which are useful in the present invention are those which have been termed "activated" phosphorus esters. By "activated" phosphorus esters is meant an ester which has at least one group which may be replaced relatively easily or in other words a "leaving group." In this respect, the enol-phosphorus or vinyl phosphorus esters are preferred. These phosphorus compounds have the general formula:

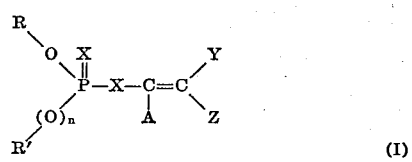

wherein R and R' may be the same or different and are selected from the group consisting of straight or branched chain alkyl, alkenyl or alkynyl of up to twelve carbon atoms, cycloalkyl of three to eight carbon atoms, aryl, alkaryl, aralkyl or aralkenyl of six to fifteen carbon atoms, which groups may further be substituted by lower alkoxy, halo, nitro, hydroxy, amino, lower alkylamino or di(lower alkyl)amino groups, wherein "lower alkoxy" or "lower alkyl" means groups containing from 1 to 8 carbon atoms, $n$ is 0 or 1, X is oxygen or sulfur, Y is hydrogen or halogen, Z is halogen,

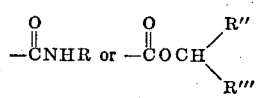

wherein R" is hydrogen, or alkyl of up to six carbon atoms, and R''' is hydrogen, phenyl or halophenyl.

A is hydrogen, alkyl of up to six carbon atoms, phenyl or halophenyl. By halogen is meant fluorine, chlorine, bromine or iodine and preferably chlorine. Halophenyl means a phenyl ring which may be mono-, di- or tri-substituted by halogen.

Typical of the alkyl groups is methyl, ethyl, butyl, isobutyl, sec-butyl, t-butyl, octyl, decyl and undecyl. Representative of alkenyl groups are allyl, vinyl, octenyl and methallyl. Alkynyl groups such as ethynyl or propargyl may be used. Typical cycloalkyl groups include cyclopropyl, cyclopentyl and cyclohexyl. Inclusive of the groups containing an aryl ring are phenyl, benzyl, phenethyl, tolyl, chlorophenyl, dichlorophenyl, N,N-dimethylaminophenyl, styryl, p-methoxyphenyl, phenylbutyl, and the like.

Preferred are those compounds according to Formula I wherein R and R' are alkyl, $n$ is 1, Z is halogen and A is hydrogen.

Typical species of these compounds include dimethyl 2,2 - dichlorovinyl phosphate (DDVP) and diethyl 2-chlorovinyl phosphate.

By thermoplastic resin is meant those polymers of thermoplastic character which have a molecular weight of preferably above about 1000 and which are solids at room temperature. Exemplary of such materials are the polyolefins, such as polyethylene, polypropylene and copolymers thereof; acrylate ester resins, such as polymethyl acrylate, polyethyl acrylate, polymethyl methacrylate, polyethyl methacrylate and copolymers thereof; vinyl resins such as polyvinyl acetate and polystyrene; polyvinyl halides such as polyvinyl chloride and copolymers thereof; polyvinylidene compounds such as polyvinylidene chloride; synthetic or natural elastomers such as Hevea brasiliensis, cis-1,4-polyisoprene, polybutadiene, SBR rubber and copolymers of such rubbers; cellulose plastics, such as cellulose acetate, cellulose butyrate, cellulose nitrate and the like. Choice of the resin will depend upon the particular phosphorus ester and hydroxylated polymer with which it is to be formulated and the conditions under which the final formulation will be employed.

The class of resins with which the dialkyl beta-halogen-substituted vinyl phosphates are most compatible and which is therefore the preferred class is that class made up of solid polyvinylic resins, that is resins whose monomers were polymerized through their vinylic double bond. These resins are typified by the polyvinyl halides such as polyvinyl chloride, which term also includes other polymers containing polyvinyl chloride such as polyvinyl chloride-polyvinyl acetate copolymers; the polyacrylate and polymethacrylate esters such as polymethyl acrylate and polymethyl methacrylate and copolymers thereof; and the polyvinyl benzenes such as polystyrene and polymerized vinyl toluene. Because they combine the most desirable physical properties with the most compatibility for dialkyl beta-halogen-substituted vinyl phosphates and are compatible with most of the hydroxylated polymers, the most preferred resins are the polyvinyl chlorides.

The plasticizers which may be used are those conventionally used in the plasticization of thermoplastic resins such as polyvinyl chloride (PVC). These plasticizers are generally of two types, i.e. phosphate esters and esters of polybasic carboxylic acids. The phosphate esters are preferably relatively non-volatile and of the type that do not possess good leaving groups. These compounds are described by the structure.

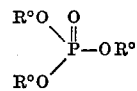

where R° can be the same or different and is a hydrocarbon radical selected from the group consisting of alkyl, aryl, aralkyl, and alkaryl preferably having at least four carbon atoms. These esters are virtually non-volatile but impart excellent plasticized properties to the resulting composition. Because of their similar composition they are readily compatible with the activated phosphorus esters in the gel compositions. Typical phosphate esters include the triaryl phosphates, such as tricresyl phosphate, triphenyl phosphate, tri(p-tert-butylphenyl) phosphate, tri(biphenylyl) phosphate, o-biphenylyl diphenyl phosphate, and cresyl diphenyl phosphate; the trialkyl phosphates such as tri-n-butyl phosphate, tri-2-ethylhexyl phosphate, tri-n-octyl phosphate and tri-lauryl phosphate; and such mixed phosphates as 2-ethyl-hexyl diphenyl phosphate and the like. Typical of the esters of polybasic carboxylic acids are phthalate esters, such as dioctyl phthalate, diphenyl phthalate, dicyclohexyl phthalate, dimethyl phthalate and the dihexyl phthalates; the sebacates, such as dibutyl sebacate, dipentyl sebacate, n-butyl benzyl sebacate and dibenzyl sebacate; the adipates, such as dioctyl adipate, dicapryl adipate, diisobutyl adipate and dinonyl adipate, and the citrates such as tributyl citrate. Because of their availability, dioctyl adipate, dioctyl phthalate and tricresyl phosphate are generally used.

Other ingredients such as pheromones, dyes, fillers, odorants or other biocides may also be added to the gel mixture without departing from the scope of this invention.

The cross-linking reaction is acid catalyzed. The acid may be either organic or inorganic. Examples of typical acids include hydrochloric, nitric, sulfuric, phosphoric, phosphonic and acetic acids and the like. Preferably the acid is a phosphorus acid which is a hydrolysis product of the phosphorus ester used in the interaction. Unless the phosphorus ester is obtained and kept in an anhydrous environment there is usually enough moisture in the atmosphere to cause the phosphorus ester to hydrolyze and form a catalytic amount of the corresponding phosphorus acid. In the absence of a catalytic amount of acid, the interaction will not proceed and cross-linking does not take place. The reaction is believed to proceed according to the following mechanism:

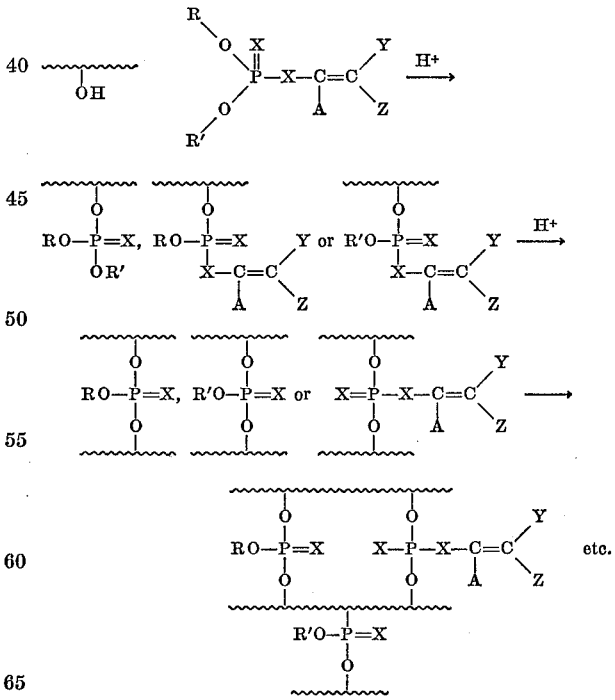

The gel formulations are dry, elastic gels which generally contain from about 10 to 80% by weight of phosphorus ester 0.5 to 30% by weight of hydroxylated polymer, 5 to 60% by weight of a thermoplastic resin and 0–50% by weight of a plasticizer for the thermoplastic resin. Preferred ranges within this group include 20–50% by weight of phosphorus ester, 1–15% by weight of the hydroxylated polymer, 20–55% by weight of the thermoplastic resin and 15–35% by weight of the resin plasticizer.

As has been previously stated, a certain amount of phosphorus in this mixture is irreversibly combined with the hydroxylated polymer. It is believed that the leaving groups of the phosphorus ester permit that ester to interact with the hydroxyl groups of the hydroxylated polymer, thereby forming a cross-linking bond between the adjacent chains or the various hydroxylated polymers. In polymers containing ester groupings in addition to hydroxyl groups, it is also possible that, through a process of transesterification, cross-linking polymer bonds are also formed.

The gel preparation consists of a preliminary mixing of the thermoplastic resin, phosphorus ester and the resin plasticizer in a mixer with a catalytic amount of an acid followed by the rapid addition of the hydroxylated polymer with further mixing. In order to preclude void formation a slight vacuum is applied during mixing. The mixture is then quickly poured into a mold of any desired configuration and gelation follows within a few minutes. Alternatively, by using a highly sorptive grade of thermoplastic resin, a dry blend may be prepared and cured by processing through an extruder. The gelation time varies according to the relative proportion of components in the mixture, the higher the proportion of thermoplastic resin, the longer the gelation time. Moreover, higher temperatures bring about curing and gelation at a more rapid rate than do lower temperatures. One of the advantages of utilizing a thermoplastic resin in the compositions of the invention is that variability in the rate of gelation may be obtained in this manner.

The gel must be thermally cured in order to insure maximum toughness. The curing time and temperature will, of course, depend upon the particular constituents used in making the formulations. For example, a gel comprising approximately 27% by weight of DDVP, 36% by weight of dioctyl adipate as plasticizer 27% polyvinyl chloride and 10% by weight of hydroxylated polyvinyl butyral and weighing about 50 to 75 grams is optimally cured in about 30 minutes at a temperature of about 150° C. Therefore, as a normal step for processing after mixing the ingredients, the formulations are thermally cured. The application of heat serves to melt the thermoplastic polymer and allows it to melt uniformly with the other constituents of the formulation. This step converts the materials from a fluid paste to a tough, elastic plastic. Thermal curing of the compositions can be carried out either by the application of heat as in an electric oven or by irradiation, for example, with microwaves.

Microwaves are very short radio waves ranging in length from 0.1 centimeter to 1000 centimeters. As part of the electromagnetic spectrum, they are generated by radio frequency powered tubes such as magnetrons, klystrons or amplitrons. Unlike thermal heating, which spreads inward from the surface of the sample, microwaves pass through matter producing a volume heating effect. This type of heating tends to be rapid and uniform throughout. As a rule of thumb, an energy deposition of 100 watt-sec./g. is required for curing. The use of microwave power does not alter the physical properties of the gel formulation as compared to oven cured formulations as will be shown later.

Gels may also be made or regenerated by soaking a preformed cross-linked polymer network, thermoplastic resin mixture or a gel from which the phosphorus ester has been partially or completely depleted, in additional amounts of the liquid phosphorus ester.

The gels are of varying degrees of toughness and are pliable or elastic in nature. Since only a minor proportion of the phosphorus ester is tied up with the hydroxylated polymer to form one phase of the gel network the major proportion of the ester remains unchanged within the gel. The thermoplastic resin comprising the second polymer has a high affinity for the phosphorus ester and the ester may be dispersed throughout.

If the vapor pressure of the phosphorus ester within the gel is sufficiently high the ester will diffuse out of the gel matrix into the surrounding atmosphere. Esters of lower vapor pressure will diffuse to the surface of the gel and when the ester at the surface is removed by action such as rubbing or wiping of the surface additional ester will diffuse out. Esters may also be removed from the gel by leaching action, i.e., by subjecting the gel to an appropriate liquid.

Since many activated phosphorus esters possess biocidal activity, and since the rate of release of the ester from the gel network takes place over a predictable prolonged period of time the gels make excellent slow release biocide generators.

The over-all rate of release of phosphorus ester from the gel at any given time is dependent upon the temperature of the gel and surrounding environment, the concentration of phosphorus ester in the gel, the amount of exposed gel surface and the rate of migration of the phosphorus ester from the body of the gel to the surface, the latter being the rate controlling step. At a given temperature and gel generator size, the rate of release is dependent upon the ability of the phosphorus ester to diffuse from within the gel to the surface. This rate of migration is related to a coefficient of proportionality called the diffusion coefficient.

One of the disadvantages of the prior art slow-release insecticide formulations is that the diffusion coefficient is low and limited in range. As a result, in order to obtain the sustained rate of release of an insecticide from the generator which is required over an extended period of time to control pests, certain restricted geometric configurations must be maintained. The most common geometric configuration has been in the form of a strip of plasticized PVC containing certain amounts of a beta-halovinyl phosphate biocide such as DDVP. This strip is rectangular in shape, and, due to the low diffusion coefficient of DDVP in this formulation, it has to have a relatively large surface area and thin cross section to permit the proper rate of diffusion of an effective amount of the biocide from within the generator to the surface. Because of the low diffusion coefficient, the pesticide emission patterns into the surrounding atmosphere for such formulations follow essentially an exponential curve with a relatively high emission rate at the outset, falling to a relatively constant lower rate. In these prior art formulations, only very limited flexibility in the rates of release from these generators is possible because of the limitations imposed by the inherent low diffusion coefficient.

When the initial release of biocide from the prior art PVC resin generators is just above the minimum effective range, the diffusion of biocide from the generator falls to an unacceptably low point long before the biocide is depleted from the resin matrix because of the low diffusion coefficient. On the other hand, when the prior art PVC generators are utilized effectively such as in rooms or other environments over a sustained period of time into the surrounding atmosphere, there is an initial high rate of release of pesticide into the atmosphere, followed by a gradually slower sustained release. All such formulations permit pesticides to be used effectively yet safely; however, the rate of release is such as results in a waste of pesticide. The high initial rate is unnecessary to the control of insects and volatile pesticide can be lost physically from a space to be treated and also lost chemically by decomposition caused by moisture. Therefore, at the onset and for sometime thereafter, the PVC formulations emit somewhat more of the pesticide than the minimum required for efficacy. Not only does this subject the pesticide to unnecessary loss but it materially reduces the effective life of the formulation. Because of processing limitations it is difficult and in some cases impossible, to fabricate a PVC insecticide generator having a substantially thicker profile with less surface area to lower the initial release rate, and even if it were feasible, because of the low diffusion coefficient, the biocide would be released from the generator at an unacceptably low rate in a relatively short period of time.

A major advantage of the compositions claimed in Ser. No. 166,978, filed July 28, 1971 lies in the ability to more completely control the release rate of biocide from the gel generators as compared to prior art generators. For comparable uses, gel generators can be formulated which initially release less biocide per unit of time than prior art generators but which continue to function effectively over the same period or even longer period of time than the prior art generators. This is brought about through properties inherent in the gel compositions and particularly by the enhanced diffusion coefficient attainable with the gels. Because of the enhanced diffusion coefficient the biocide diffuses more readily from within the gel to the gel surface. It is therefore possible to formulate the gels into various geometric configurations having much thicker profiles than the prior art generators. This fact coupled with the ability of the gels to contain more biocide per unit of weight than the prior art compositions and to be easily processed makes it possible to formulate generators which are more compact in size and therefore have less surface area than prior art generators for similar use. Therefore by regulating biocide content, generator size, surface area and diffusion coefficient it is possible to formulate gel compositions having the desired initial rate of biocide release and which continue to generate biocide at biocidally effective rates over a sustained period of time. Ser. No. 166,978, filed July 28, 1971 states that the diffusion coefficient of binary gels can be varied for any gel mixture by the addition of a plasticizer thereto. In general, the addition of the plasticizer serves to increase the diffusion coefficient. While this is a highly desirable aspect, and allows a much greater flexibility in the choice of generator size and shape as well as biocide output for some application the initial biocide output would be higher than is necessary or even desirable.

A distinct advantage of the compositions of the present invention is that in addition to having substantially increased gel strength by the addition of the thermoplastic resin, the thermoplastic resin also serves to offer a greater degree of variability as to the diffusion coefficient. At minimum thermoplastic resin concentration, the diffusion coefficient is essentially unchanged, and the main advantage lies in the increased strength resulting from the introduction of the second polymer into the system. However, as the proportion of thermoplastic resin increases in the gel formulation, the diffusion coefficient decreases. By choosing the optimum ratio of thermoplastic resin plasticizer, hydroxylated polymer and phosphorus ester, the desired release rate of biocide from the gel may be obtained.

The diffusion coefficient of the gels made up of a phosphorus ester and a hydroxylated polymer may therefore be varied by the addition thereto of a thermoplastic resin and may be further varied by a plasticizer of the type well-known in the art for plasticizing thermoplastic resins. This permits greater control in the selection of a particular gel having the desired rate of release of biocide into the atmosphere, allows for greater gel strength and also provides for a greater degree of flexibility in choosing generator size and shape. As has previously been stated, the thermoplastic resins tend to decrease the diffusion coefficient whereas the plasticizer tends to soften the thermoplastic resin and increase the diffusion coefficient. The presence of both the thermoplastic resin and the plasticizer reduces the gelation rate making those mixtures which have a tendency to gel rapidly more workable. Moreover, the thermoplastic resin and the plasticizer serve as a diluent for the phosphorus esters thereby reducing cost and the inherent toxicity of the gel formulations.

Another important advantage possessed by the gels of ths invention is the fact that these compositions are very resistant to "bleeding" or "sweating." These terms refer to the formation of droplets of liquid at the surface of a biocidal slow release generator. Phosphorus esters, DDVP in particular, are hygroscopic and when they diffuse to the surface of a generator may interact with water from the surrounding environment to form droplets of hydrolysis products on the generator surface. This problem is virtually non-existent in the formulations of this invention. For example, as little as 1% of a hydroxylated polymer may be sufficient to prevent formation of surface liquid from a composition comprising primarily phosphorus ester, thermoplastic resin and plasticizer.

A distinct advantage of the gels is their ability to diminish in size at a rate proportional to the rate of depletion of ester from the gel network. This makes it possible to gauge directly the amount of phosphorus ester remaining in the gel based on the extent to which shrinkage has occurred. For example, a phosphorus ester insecticide such as DDVP can be interacted with a hydroxylated polymer to form a gel fabricated in spherical form which is then placed over a cylindrical opening. The relative sizes of the sphere and opening are pre-determined with the sphere having a diameter larger than the opening. The change of position of the sphere on the opening informs the user of the degree of depletion of phosphorus ester from the sphere. The relative dimensions are so chosen that at the point at which sub-efficacious amounts of insecticide are being delivered the sphere drops through the opening. From this example myriad other systems of depletion indication based on this principle are evident.

One of the disadvantages associated with present commercial slow release resin insecticide generators is the inability to determine when efficacious amounts of insecticide cease to be discharged from the generator. Thus, compositions of the present invention offer a solution to this problem.

These gel compositions are highly effective for the killing of invertebrate pests, including various microorganisms, nematodes, ticks, spiders, mites and insects by subjecting them to the composition of the invention. For example, the compositions can be made into medallions which may be hung from a collar of a pet which will result in the sustained release of phosphorus ester over a period of time, thereby controlling normal ectoparasites to be found on such animals such as fleas and ticks. Moreover, the compositions of the present invention can be utilized as granules or pellets and placed in soil wherein the slow sustained release of phosphorus ester from the compositions results in the control of various soil pests such as nematodes, cutworms, rootworms, etc. The gels of the present invention can also be used for fumigation purposes by being placed in warehouses, grain bins, etc. The major use anticipated for the gels is placing the desired geometrical form in a closed space, such as a room, whereby the sustained release of phosphorus ester into the atmosphere results in the control of any pests present, i.e., pests such as houseflies and mosquitoes.

Example I

The preparation of solid phosphorus ester gels resistant to surface liquid development in comparison with prior art phosphorus ester resins is illustrated by this example. In all of the following runs, the phosphorus ester used was DDVP. The resin was a polyvinyl chloride homopolymer (Geon 135®) having an inherent viscosity of 1.12 as determined by ASTM D 1243–66. The plasticizer was either dioctyl phthalate (DOP) or dioctyl adipate (DOA). The hydroxylated polymer was a polyvinyl butyral (PVB) having an average molecular weight in the range of 38,000 to 45,000 having a hydroxyl content of 18 to 20% expressed as weight percent polyvinyl alcohol and an acetate content of 0 to 1% expressed as weight percent polyvinyl acetate. The first series of tests were made without polyvinyl butyral. The DDVP/PVC resin and plasticizer were mixed in a glass test tube and placed in an oil bath at 125° C. The mixture was heated until clear and then cooled in the test tube. In the second series of tests, the plasticizer was replaced by polyvinyl butyral which was added during the mixing step and the procedure outlined above was followed. The mixtures which were solidified in the test tubes were removed by breaking the glass. Each blend was then allowed to stand in an open room and was periodically checked for surface liquid formation with results as follows:

TABLE I

| Blend | 1 | 2 | 3 | 4 | 5 | 6 | 7 |
|---|---|---|---|---|---|---|---|
| Percent weight DDVP | 60 | 60 | 60 | 60 | 60 | 60 | 60 |
| Percent weight PVC | 20 | 20 | 20 | 30 | 30 | 10 | 10 |
| Percent weight plasticizer | [1]20 | [2]10 | | [1]10 | | [1]30 | |
| Percent weight PVB | | 10 | 20 | | 10 | | 30 |
| Surface liquid: | | | | | | | |
| After 2 days | (3) | (3) | (3) | (3) | (3) | (3) | (3) |
| After 9 days | (4) | (3) | (3) | (4) | (3) | (5) | (3) |
| After 19 days | (4) | (3) | (3) | (4) | (3) | (4) | (3) |
| After 8 months | | (3) | | | (3) | (4) | (3) |

[1] DOP.  [2] DOA.  [3] None.  [4] Present.  [5] Slight.

This example shows the superiority of the products of this invention over prior art formulations in resistance to surface liquid formation.

Example II

The following gels were prepared from (1) DDVP; (2) a polyvinyl butyral having an average molecular weight range of 180,000 to 270,000, a hydroxyl content of 17.5–21% expressed as weight percent polyvinyl alcohol and an acetate content of 0–2.5% expressed as weight percent polyvinyl acetate (3) Geon 135® (PVC) and optionally containing (4) dioctyl adipate (DOA) as a plasticizer.

The gels were formed by blending the DDVP, PVC and DOA in a high speed blender for about 60 seconds under vacuum to form a uniform mixture. The polyvinyl butyral was then added to the solution which was further blended for about 45 seconds and then poured into test tubes. The mixture in the test tubes was cured at about 160° for 5 minutes and then cooled, packaged in sealed laminated pouches and stored for further testing.

Stable gels of the following formulations were prepared.

TABLE II

| Percent DDVP | Percent PVB | Percent PVC | Percent DOA |
|---|---|---|---|
| 80 | 5 | 10 | 5 |
| 80 | 5 | 15 | |
| 70 | 10 | 20 | |
| 70 | 5 | 10 | 15 |
| 70 | 5 | 25 | |
| 60 | 10 | 20 | 10 |
| 60 | 5 | 5 | 30 |
| 60 | 5 | 10 | 25 |
| 60 | 5 | 25 | 10 |
| 50 | 10 | 20 | 20 |
| 50 | 5 | 30 | 15 |
| 50 | 10 | 10 | 30 |
| 50 | 10 | 30 | 10 |
| 40 | 10 | 20 | 30 |
| 40 | 5 | 40 | 15 |
| 36 | 2 | 31 | 31 |
| 30 | 10 | 20 | 40 |
| 30 | 10 | 40 | 20 |
| 30 | 5 | 20 | 45 |
| 20 | 10 | 40 | 30 |
| 20 | 5 | 50 | 25 |

It is evident from the above that the gel components may vary over a relatively wide range.

Example III

Weighed amounts of dimethyl 2,2-dichlorovinyl phosphate (DDVP) dioctyl adipate plasticizer, PVC resin (Geon 135®) and a PVC stabilizer were combined in a Waring Blender under slight vacuum to minimize air entrainment for 60 seconds. Polyvinyl butyral polymer containing about 80% by weight polyvinyl butyral units, 18–20% by weight polyvinyl alcohol units and 0–2% of polyvinyl acetate units and having a molecular weight average of about $1.8$–$2.7 \times 10^5$ was then added and the mixing continued for another ten seconds under vacuum. The resulting viscous blend was poured into wide mouth polyethylene bottles for microwave curing. Control samples were poured into glass molds for curing in an electrically heated oven.

The microwave samples were irradiated for a predetermined period of time ranging from about 50 to 75 seconds at a power input of about 1000 watts after which the samples were withdrawn and quenched in cold water to shorten the cooling time. When cool, the cured gels were removed from the mold and trimmed to uniform measurements for vaporization studies. They were cut to approximately 3 to 5 centimeters in length, with a diameter of about 4 centimeters and weighed approximately 50 to 70 grams. The control samples were heated in an electric oven for 30 minutes at 150° C. and were trimmed to be comparable in size and overall dimensions with the microwave cured gels, with which they were compared for performance characteristics.

The uncured samples were opaque viscous mixtures and were subsequently cured to the point where a tough, translucent rubbery gel was obtained. These mixtures were resistant to surface liquid formation; in other words the sample surfaces were not observed to contain droplets of liquid on the outer surface during either storage or use. After storage tests, samples were suspended in a chemical fume hood and weight loss data were collected as a function of time. From these data, diffusion coefficients of DDVP for each sample were determined. The data collected is recorded in the table below.

TABLE III

| Formulation | Percent by wt. | Type of cure | Diffusion coefficient, in.$^2$/day (duplicate determination) |
|---|---|---|---|
| DDVP | 29 | Microwave oven | $3.4 \times 10^{-4}$ |
| PVC | 26 | | $3.4 \times 10^{-4}$ |
| DOA | 35 | | |
| PVB | 10 | | |
| PVC[1] stabilizer | 3 | | |
| DDVP | 39 | do | $2.7 \times 10^{-4}$ |
| PVC | 24 | | $2.8 \times 10^{-4}$ |
| DOA | 24 | | |
| PVB | 10 | | |
| PVC[1] stabilizer | 3 | | |
| DDVP | 35 | do | $3.2 \times 10^{-4}$ |
| PVC | 26 | | $3.2 \times 10^{-4}$ |
| DOA | 26 | | |
| PVB | 10 | | |
| PVC[1] stabilizer | 3 | | |

[1] Mark QT (Argus Chemical Co.).

Example IV

The importance of geometry and composition on the vapor release characteristics of biocide generators is illustrated in this example. Compositions A and B consisted of a gel containing 35% w. DDVP, 26% w. PVC (Geon 135®), 26% w. dioctyl adipate (DOA), 10% w. of the polyvinyl butyral described in Example III and 3% w. PVC stabilizer. Composition C was a prior art slow release formulation comprising 23% w. DDVP, 19% w. DOA, 55% w. PVC and 3% w. PVC stabilizers. Vaporization rate and vapor concentration studies were conducted over an extended period of time. Vapor concentration measurements were made in an unfurnished 1000 cubic foot chamber maintained at 75° F. and 50% relative humidity having forced air circulation with no ventilation. Vaporization rates were determined from weight loss data of generators maintained in a hood at 70–75° F., 30–50% relative humidity under a linear air flow rate of 100 feet per minute.

The generators in the hood were weighed at periodic intervals and the vaporization rate was determined based on the amount of biocide lost from the generator. The generators were periodically placed in the above-mentioned 1000 ft.$^3$ chamber and allowed to remain there for 24 hours to allow vapor concentration in the air to reach equilibrium. Air samples were then taken and analyzed to determine biocide vapor concentration. The results are recorded in the following table.

TABLE IV

| Composition | Geometry | Initial weight (grams) | Av. vaporization rate (mg./hr.) [Vapor concentration (micrograms/liter)] at— | | | | | | | Percent depletion at 120 days |
|---|---|---|---|---|---|---|---|---|---|---|
| | | | 1 day | 20 days | 40 days | 60 days | 80 days | 100 days | 120 days | |
| A | Single surface having 7 in.² surface area and 0.4 inch depth. | 57 | 12 [.12] | 7 [.11] | 4 [.10] | 3.5 [0.09] | 3 [0.08] | 2.5 [0.07] | 2 [0.05] | 60 |
| B | Cylindrical shape, 2 in. weight x 1.5 inch diameter, 13 in.² surface area. | 71 | 23 [0.33] | 9 [0.22] | 6 [0.14] | 4 [0.10] | 3 [0.08] | 2 [0.07] | 1.8 [0.05] | 65 |
| C | Rectangular strip 10 in. x 2.5 inch x 0.22 in. having 55.5 in. surface area. | 110 | 29 [0.48] | 5 [0.08] | 3 [0.03] | 2 [0.03] | 2 [0.03] | ᵃ 1.6 ᵃ [0.03] | | ᵃ 45 |

ᵃ 90 days.

It is apparent from the foregoing that the gel compositions of this invention can be fabricated to emit less biocide initially than the prior art vaporizers but continue to emit useful quantities of biocide over a longer period of time.

Example V

The wide range of formulations and geometrical configurations giving an equally wide range in the rate of biocide diffusion are illustrated by this example. The composition and geometrical configuration of each generator are as follows:

TABLE V

| Generator | Percent DDVP | Percent DOA | Percent polyvinyl butyral | Percent PVC | Geometry | Surface area (in.²) |
|---|---|---|---|---|---|---|
| A | 36 | 36 | 10 | 18 | Cylinder: 3″ diameter, .5″ length | 18.7 |
| B | 45 | 18 | 10 | 27 | Cylinder: 1″ diameter, 4.5″ length | 15.7 |
| C | 27 | 45 | 10 | 18 | Cylinder: 1.5″ diameter, 2″ length | 12.9 |
| D | 27 | 18 | 10 | 45 | Cylinder: 3″ diameter, .5″ length (only one vaporizing surface) | 7.0 |

Vaporization rates over a 140 day period using the above generators are as follows:

| Generator | Vaporization rate (mg./hr.) at— | | | | | | | |
|---|---|---|---|---|---|---|---|---|
| | 1 day | 20 days | 40 days | 60 days | 80 days | 100 days | 120 days | 140 days |
| A | 40 | 12 | 7 | 4 | 3 | 2 | 1.5 | 1.0 |
| B | 30 | 9.5 | 6.5 | 5 | 4 | 3 | 2.5 | 2.5 |
| C | 23 | 7 | 4.5 | 3 | 2.5 | 2 | 1.7 | 1.5 |
| D | 5 | 2.5 | 1.5 | 1.2 | 1.0 | 1.0 | 1.0 | 1.0 |

Example VI

The improvement of the compositions of the present invention toward development of surface liquid over comparable formulations not containing the gel forming hydroxylated polymer is illustrated in this example.

Samples of slow release generators comprising 23% w. DDVP, 19% w. of either DOA or DOP as a plasticizer and 3% wt. of a PVC stabilizer but having varying contents of polyvinyl chloride (Geon 102®) and polyvinyl butyral polymer (PVB) having a polyvinyl butyral content of about 80% w.; 18–20% w. of polyvinyl alcohol units and 0–2% w. of polyvinyl acetate units and a molecular weight of about 1.8 to $2.7 \times 10^5$ were prepared for testing. All samples were stored in individual containers, 10 x 2 x 2 inches. The containers were not tightly sealed and DDVP vapors tended to remain trapped in the containers while water vapor could enter the container. This type of environment is conducive to the formation of liquid droplets on the generator surface which is referred to as "sweating." Tests were conducted under two sets of conditions, i.e., Ambient (temperature 70–74° F. and humidity 35–50%) and Stress (temperature 85–95° F. and humidity 80–100%). The results are as follows:

TABLE VI

| Formulation | | | Approximate time to sweat (days) | |
|---|---|---|---|---|
| Plasticizer | Percent PVC | Percent PVB | Ambient | Stress |
| DOA [1] | 55 | 0 | 25–35 | 5–25 |
| DOA [1] | 54 | 1 | >55 | 25 |
| DOA [1] | 53 | 2 | >65 | 25 |
| DOA [1] | 50 | 5 | >70 | 45 |
| DOA [1] | 45 | 10 | >150 | 105 |
| DOP [2] | 55 | 0 | 5–50 | 5–10 |
| DOP [2] | 54 | 1 | >95 | ³ 50–70 |
| DOP [2] | 53 | 2 | >95 | ³ 50–70 |
| DOP [2] | 50 | 5 | >95 | ³ 75 |

[1] Strip 6½ x 2½ x 0.3 inches.
[2] Strip 10 x 2½ x 0.2 inches.
³ Light sweating.

The gels formed in Examples VII to X were prepared by hand mixing 50 grams of the various ingredients in the proportions indicated in a 150 ml. beaker. The mixtures were then cured at 150° C. for 15–45 minutes unless otherwise indicated.

Example VII

A mixture comprising 50% w. diethyl, 2-chlorovinyl phosphate, 30% w. hydroxypropylcellulose having a molecular weight of about $9 \times 10^5$ (Klucel H®) and 20% w. polypropylene powder having a melt flow index of 7.5 gelled rapidly at ambient temperatures with the polypropylene particles present as a suspension. In order to fuse the polypropylene the gel was subsequently milled in a Brabender Plasticorder mixer head equipped with roller blades at 350° F. The fused gel sample was slightly darker in color and was rigid.

Example VIII

A mixture comprising 50% w. of 2-carbomethoxy-1-methylvinyl dimethyl phosphate, α isomer, 15% w. of hydroxypropylcellulose as defined in Example VII and 30% w. of a polyvinylacetate having an average molecular weight of about 45,000 (Gelva V–7®) formed a gel at ambient temperatures. A soft clear gel was obtained upon curing at 300° F. for 15 minutes.

Example IX

A mixture of 75% w. dimethyl 2-chlorovinyl phosphate, 10% w. of a high molecular weight acid carboxyvinyl polymer of acrylic acid copolymerized with 2% polyallyl sucrose (Carbopol 934®), 10% w. cellulose acetate having an average acetyl content of 39.8% w. and a viscosity of 22–38 seconds as determined by ASTM Method D–1343–56 and 5% w. of dibutyl phthalate as plasticizer for cellulose acetate gelled slowly and was cured for 25 minutes at 300° F.

Example X

A mixture of 60% w. of diethyl 2-chlorovinyl phosphate, 10% w. of a high molecular weight polymer described in Example IX and 30% w. of an acrylonitrile-butadiene-styrene resin (Blendex 311®) having a specific gravity of 0.98 gelled and was cured at 300° F. for 45 minutes.

Example XI

The efficacy of a typical gelled composition is shown in this example. A single surface gel weighing 75.82 grams and having a diameter of 3 inches and a depth of 0.4 inches (7.0 in.² surface area) consisting of 35% w. DDVP, 26% w. PVC (Geon 135®), 26% w. DOA, 10% of the polyvinyl butyral described in Example III and 3% w. PVC stabilizer were tested under "initial" and "equilibrium" conditions in a 1000 ft.³ test chamber maintained at 75° F. and 50% relative humidity. For the "initial" test the sample and houseflies were introduced into the test chamber at the same time and the time in minutes (Min.)

to effect a 50% (KD 50) and 90% (KD 90) knockdown of the houseflies recorded. The vapor concentration of DDVP at KD 50 and KD 90 in terms of micrograms/liter of air (Con.) was also recorded. For "equilibrium" conditions the sample was allowed to remain in the test chamber for a period of 7 or 24 hours as indicated in the table below whereupon cages of houseflies were then introduced into the chamber and the KD 50 and KD 90 recorded along with the vapor concentration of DDVP. For each test four small cages containing 10 flies each were suspended six feet above the floor and two large cages containing 100 flies each were placed on the floor of the chamber. The results recorded are the average of the six cages. When not in the test chamber the sample was placed in a hood maintained at 70–75° F. and 30–50% relative humidity under a linear air flow rate of 100 ft./minute.

TABLE VII

| Days | Conditions | KD 50 | | KD 90 | |
|---|---|---|---|---|---|
| | | Min. | Con. | Min. | Con. |
| 0 | Initial | 58 | 0.06 | 76 | 0.07 |
| 0 | Equilibrium [1] | 22 | 0.16 | 30 | 0.17 |
| 9 | Initial | 62 | 0.06 | 75 | 0.07 |
| 9 | Equilibrium [1] | 22 | 0.16 | 30 | 0.17 |
| 17 | Initial | 62 | 0.06 | 78 | 0.06 |
| 17 | Equilibrium [1] | 23 | 0.16 | 27 | 0.18 |
| 24 | Initial | 56 | 0.06 | 75 | 0.07 |
| 24 | Equilibrium [1] | 32 | 0.11 | 43 | 0.17 |
| 28 | Initial | 55 | 0.07 | 80 | 0.06 |
| 28 | Equilibrium [1] | 26 | 0.14 | 35 | 0.14 |
| 31 | Initial | 64 | 0.06 | 77 | 0.06 |
| 31 | Equilibrium [1] | 29 | 0.12 | 39 | 0.13 |
| 35 | Initial | 65 | 0.06 | 82 | 0.06 |
| 36 | Equilibrium [2] | 28 | 0.13 | 37 | 0.13 |
| 42 | Initial | 62 | 0.06 | 80 | 0.06 |
| 43 | Equilibrium [2] | 33 | 0.11 | 43 | 0.12 |
| 49 | Initial | 90 | 0.04 | 104 | 0.05 |
| 50 | Equilibrium [2] | 39 | 0.09 | 49 | 0.10 |
| 73 | do | 34 | 0.10 | 46 | 0.11 |
| 93 | do | 44 | 0.08 | 58 | 0.09 |
| 114 | do | 45 | 0.08 | 61 | 0.08 |
| 127 | do | 73 | 0.05 | 100 | 0.05 |

[1] 7 hours exposure in test chamber.
[2] 24 hours exposure in test chamber.

From the above it is evident that the sample tested serves as a useful slow release generator for a period of at least four months.

Example XII

The gel formed in Example XI having a single surface in the form of a cylinder 2.1 inches in diameter and 0.08 inches deep was placed in a 1000 ft.³ test chamber as described in Example XI under "initial" test conditions. The KD 50 was reached in 95 minutes and the KD 90 was recorded at 109 minutes.

We claim as our invention:

1. A gel-like pesticidal composition for killing invertebrate pests comprising an effective amount of a mixture of
(1) 10–80% wt. of a phosphorus ester of the formula $$\begin{array}{c} R \\ \diagdown O \diagdown \\ P-X-C=C \diagup X \\ \diagup (O)_n \quad R \diagdown Z \\ R' \end{array}$$

wherein
R and R' may be the same or different and are selected from the group consisting of straight or branched chained alkyl, alkenyl or alkynyl of up to twelve carbon atoms, cycloalkyl of three to eight carbon atoms, aryl, alkaryl, aralkyl or aralkenyl of six to fifteen carbon atoms, which groups may further be substituted by lower alkoxy, halo, nitro, hydroxy, amino, lower alkyl-amino or di(loweralkyl)amino;
$n$ is 0 or 1,
X is oxygen or sulfur,
A is hydrogen, alkyl of up to six carbon atoms, phenyl or halophenyl,
Y is hydrogen or halogen,
Z is halogen, $$-\overset{O}{\underset{\|}{C}}-NHR'', \quad \text{or} \quad -\overset{O}{\underset{\|}{C}}OCH\diagup\overset{R''}{\underset{R'''}{\diagdown}}$$

wherein R'' is hydrogen or alkyl of up to six carbon atoms and R''' is hydrogen, phenyl or halophenyl;

(2) 0.5–30% wt. of a hydroxylated polymer compatible with said ester having a molecular weight of about 30,000 to 1,000,000 and having the structure $$\left[-CH_2CH\diagup\overset{CH_2}{\underset{O}{\diagdown}}CH-\right]_a \left[-CH_2-CH-\right]_b \left[-CH_2-CH-\right]_c$$

(with OH on b unit and O–C(=O)–Y' on c unit, and C–H/Q on a unit)

wherein Q is H, alkenyl, haloalkyl or hydroxyalkyl of 1 to 8 carbon atoms, alkenyl of 2 to 8 carbon atoms, halogen or hydroxyl, Y' is alkyl of 1 to 9 carbon atoms, $a$, $b$ and $c$ are integers indicating the relative percent by weight of the respective groups in the polymer, $a$ being an integer from 0 to 99, $b$ being an integer of at least 1, and $c$ being an integer from 0 to 99, a minor proportion of from about 0.5 to 5% by weight of said ester being interacted with said polymer to form a cross-linked polymer network;

(3) 5–60% wt. of a compatible thermoplastic resin, and (4) 0–50% wt. of a plasticizer for thermoplastic resins selected from the group consisting of phosphate esters and esters of polybasic carboxylic acids.

2. A composition according to claim 1 which comprises 20–50% wt. phosphorus ester, 1–50% wt. hydroxylated polymer, 20–55% wt. thermoplastic resin and 15–35% wt. plasticizer.

3. A composition according to claim 1 wherein R and R' are alkyl, $n$ is 1, Z is halogen and A is hydrogen.

4. A composition according to claim 3 wherein $b$ is an integer from 3 to 35 and $a$ and $c$ are integers from 0 to 97.

5. A composition according to claim 3 wherein R and R' are methyl, Z is chlorine, Y is chlorine and X is oxygen.

6. A composition according to claim 5 wherein $a$ is an integer of about 80, $b$ is an integer from about 18–20 and $c$ is an integer of 0–2, Y is $C_3H_7$ and Y' is $CH_3$.

7. A composition according to claim 6 wherein the polymer has an average molecular weight of about 180,000 to 220,000.

8. A composition according to claim 7 wherein the thermoplastic resin is polyvinyl chloride.

9. A composition according to claim 8 wherein the plasticizer is selected from the group consisting of dioctyl adipate and dioctyl phthalate.

10. A method of killing invertebrate pests which comprises subjecting said pests to a pesticidally effective amount of the composition of claim 1.

References Cited

UNITED STATES PATENTS

| | | | |
|---|---|---|---|
| 3,318,769 | 5/1967 | Folckemer et al. | 424—219 |
| 3,424,601 | 1/1969 | Hamilton | 106—177 |
| 2,733,229 | 1/1956 | Brace | 260—73 |
| 2,495,108 | 1/1950 | Kosolapoff | 260—80 |
| 3,253,984 | 5/1966 | Seymour et al. | 424—81 |

SAM ROSEN, Primary Examiner

V. D. TURNER, Assistant Examiner

U.S. Cl. X.R.

424—19, 219

UNITED STATES PATENT OFFICE
CERTIFICATE OF CORRECTION

PO-1050 (5/69)

Patent No. 3,769,416     Dated October 30, 1973

Inventor(s) RONALD S. SMITH, JEROME C. KUDERNA, JR. and RICHARD C. POTTER

It is certified that error appears in the above-identified patent and that said Letters Patent are hereby corrected as shown below:

In claim 1, column 15, lines 54-62, that portion of the structural formula reading

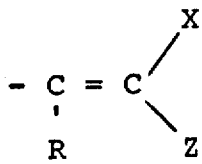

should read

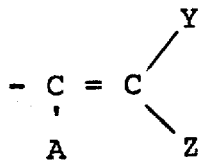

Signed and sealed this 20th day of August 1974.

(SEAL)
Attest:

McCOY M. GIBSON, JR.
Attesting Officer

C. MARSHALL DANN
Commissioner of Patents